(12) United States Patent
Tripathi et al.

(10) Patent No.: US 11,524,255 B2
(45) Date of Patent: Dec. 13, 2022

(54) FILTER ELEMENT CENTER TUBE CAGE WITH POKE YOKE FEATURE

(71) Applicant: Cummins Filtration Inc., Nashville, TN (US)

(72) Inventors: Narendra Kumar Tripathi, Belgaum (IN); Ruchi Lutade, Pune (IN); Devendra Kalaskar, Pune (IN); Santosh Bhagwat, Pune (IN)

(73) Assignee: Cummins Filtration Inc., Nashville, TN (US)

( * ) Notice: Subject to any disclaimer, the term of this patent is extended or adjusted under 35 U.S.C. 154(b) by 436 days.

(21) Appl. No.: 16/674,574

(22) Filed: Nov. 5, 2019

(65) Prior Publication Data

US 2021/0129064 A1 May 6, 2021

(51) Int. Cl.
*B01D 46/24* (2006.01)
*B60K 15/03* (2006.01)

(52) U.S. Cl.
CPC .... *B01D 46/2414* (2013.01); *B60K 15/03006* (2013.01); *B60K 2015/03236* (2013.01)

(58) Field of Classification Search
CPC .......... B01D 46/2414; B60K 15/03006; B60K 2015/03236

USPC .......................................................... 55/482
See application file for complete search history.

(56) References Cited

U.S. PATENT DOCUMENTS

| 2010/0031940 | A1* | 2/2010 | Mosset | B01D 46/2414 123/573 |
| 2014/0298763 | A1* | 10/2014 | Blossey | F02M 35/02416 55/498 |
| 2019/0299143 | A1* | 10/2019 | Decoster | F02M 35/0214 |

\* cited by examiner

*Primary Examiner* — Robert A Hopkins
*Assistant Examiner* — Qianping He
(74) *Attorney, Agent, or Firm* — Foley & Lardner LLP

(57) ABSTRACT

Various example embodiments relate to a filtration system. The filtration system includes a filter housing having a first housing end and a second housing end. The filter housing includes a housing cover defining an outlet. The housing cover includes a first guidance element extending from an internal portion of the housing cover axially away from the outlet. A second guidance element extends from the internal portion of the housing cover axially away from the outlet. A filter element has a first filter end and a second filter end. The filter element includes an end cap adjacent the first filter end and defining an end cap opening therethrough. The end cap includes a channel around the end cap opening. Filter media has a first media end and a second media end. The filter media extends axially from the first media end toward the second media end.

20 Claims, 6 Drawing Sheets

FILTER ELEMENT CENTER TUBE CAGE WITH POKE YOKE FEATURE

TECHNICAL FIELD

The present application relates to filter elements for filtering fluids in internal combustion engine systems or the like.

BACKGROUND

Internal combustion engines generally combust a mixture of fuel (e.g., gasoline, diesel, natural gas, etc.) and air. Prior to entering the engine, the fluid (e.g., liquid, air, etc.) is typically passed through a filtration system to remove contaminants (e.g., dust, water, oil, etc.) from the fluid. The filtration system includes a filter element having filter media. As the fluid passes through the filter media of the filter element, the filter media removes at least a portion of the contaminants in the fluid, thereby preventing unwanted contaminants from entering the internal combustion engine. In some cases, unauthorized or non-genuine replacement filter elements may be installed in the filtration systems during servicing operations. The unauthorized and non-genuine replacement filter elements may be of inferior quality to genuine, authorized filter elements and/or may not allow proper alignment of the filter element and auxiliary flow passages within a filter housing. Thus, the use of unauthorized or non-genuine replacement filter elements may cause damage to the engine by allowing contaminants past the filter element, restrict flow through one or more flow passages, and/or prevent proper installation of the filter element within the filter housing.

Filter elements often include a seal member that is compressed against a component of the filtration system housing or another portion of the filtration system. The seal member forms a seal between the filtration system housing and the filter element, thereby preventing fluid from bypassing the filter element (e.g., for air to bypass an air filter element or liquid to bypass a liquid filter element). The seal can be formed by, for example, a key element deposed on the filter element and a complementary key slot disposed on the housing. If an improper filter element (i.e., a non-authorized or non-genuine filter element) is installed in a filtration system, or if the proper filter element is installed incorrectly, the seal member of the filter element may not form a proper seal, and fluid may bypass the filter element, causing damage to downstream components.

SUMMARY

Various example embodiments relate to a filtration system. The filtration system includes a filter housing having a first housing end and a second housing end. The filter housing includes a housing cover defining an outlet. The housing cover includes a first guidance element extending from an internal portion of the housing cover axially away from the outlet. A second guidance element extends from the internal portion of the housing cover axially away from the outlet. A filter element has a first filter end and a second filter end. The filter element includes an end cap adjacent the first filter end and defining an end cap opening therethrough. The end cap includes a channel around the end cap opening. Filter media has a first media end and a second media end. The filter media extends axially from the first media end toward the second media end. The first media end is adjacent the end cap. The filer media defines a central opening that extends axially between the first media end and the second media end. A center tube is positioned within the central opening of the filter media. A first tube end is positioned within the channel of the end cap, and a second tube end is positioned axially away from the first tube end. The center tube includes a first pocket and a second pocket. The first pocket extends from the first tube end axially away from the second tube end. The second pocket extends from the first tube end axially away from the second tube end. The first pocket orientation and the second pocket orientation are non-parallel to a central axis laterally along the first tube end. Engagement of the first filter end and the housing cover occurs when the first pocket receives the first housing guidance element and the second pocket receives the second housing guidance element of the filter housing.

Another example embodiment relates to a filter element. The filter element includes an end cap adjacent the first filter end and defining an end cap opening therethrough. The end cap includes a channel around the end cap opening. Filter media has a first media end and a second media end. The filter media extends axially from the first media end toward the second media end. The first media end is adjacent the end cap. The filer media defines a central opening that extends axially between the first media end and the second media end. A center tube is positioned within the central opening of the filter media. A first tube end is positioned within the channel of the end cap and a second tube end is positioned axially away from the first tube end. The center tube includes a first pocket and a second pocket. The first pocket extends from the first tube end axially away from the second tube end. The second pocket extends from the first tube end axially away from the second tube end. The first pocket orientation and the second pocket orientation are non-parallel to a central axis laterally along the first tube end. Engagement of the first filter end and the housing cover occurs when the first pocket receives the first housing guidance element and the second pocket receives the second housing guidance element of the filter housing.

Another example embodiment relates to a filter housing. The filter housing includes a first housing end and a second housing end. The filter housing includes a housing cover defining an outlet. The housing cover includes a first guidance element extending from an internal portion of the housing cover axially away from the outlet. The first guidance element includes a first shaft that extends from the internal portion of the housing cover axially away from the outlet and a first face portion positioned at an end of the first shaft. A second guidance element extends from the internal portion of the housing cover axially away from the outlet. The second guidance element includes a second shaft that extends from the internal portion of the housing cover axially away from the outlet and a second face portion positioned at an end of the second shaft. The second guidance element orientation and the first guidance element orientation are non-parallel to a central axis laterally along the first housing end. The first guidance element is configured to be inserted into a first pocket of a filter element. The second guidance element is configured to be inserted into a second pocket of the filter element. Engagement of the filter element and the filter housing occurs when the first pocket receives the first face portion and a portion of the first shaft of the first housing guidance element and the second pocket receives the second face portion and a portion of the second shaft of the second housing guidance element of the filter housing.

Another example embodiment relates to a method of filter element installation. The method include providing a filter housing. The filter housing has a first housing end and a second housing end. The filter housing includes a housing cover defining an outlet. The housing cover includes a first guidance element extending from an internal portion of the housing cover axially away from the outlet. A second guidance element extends from the internal portion of the housing cover axially away from the outlet. A filter element is positioned within the internal portion of the housing cover. The filter element has a first filter end and a second filter end. The filter element includes an end cap adjacent the first filter end and defining an end cap opening therethrough. The end cap includes a channel around the end cap opening. A center tube is positioned within the channel. A first tube end is positioned within the channel of the end cap, and a second tube end is positioned axially away from the first tube end. The center tube includes a first pocket and a second pocket. The first pocket extends from the first tube end axially away from the second tube end. The second pocket extends from the first tube end axially away from the second tube end. The first pocket orientation and the second pocket orientation are non-parallel to a central axis laterally along the first tube end. The first pocket of the filter element is aligned with the first guidance element of the filter housing and the second pocket of the filter element is aligned with the second guidance element of the filter housing by rotating the filter element within the internal portion of the housing. The first pocket of the filter element is inserted into the first guidance element of the filter housing and the second pocket of the filter element is inserted into the second guidance element of the filter housing. Engagement of the first filter end and the housing cover occurs when the first pocket receives the first housing guidance element and the second pocket receives the second housing guidance element of the filter housing.

These and other features, together with the organization and manner of operation thereof, will become apparent from the following detailed description when taken in conjunction with the accompanying drawings, wherein like elements have like numerals throughout the several drawings described below.

DETAILED DESCRIPTION

Figure 1:
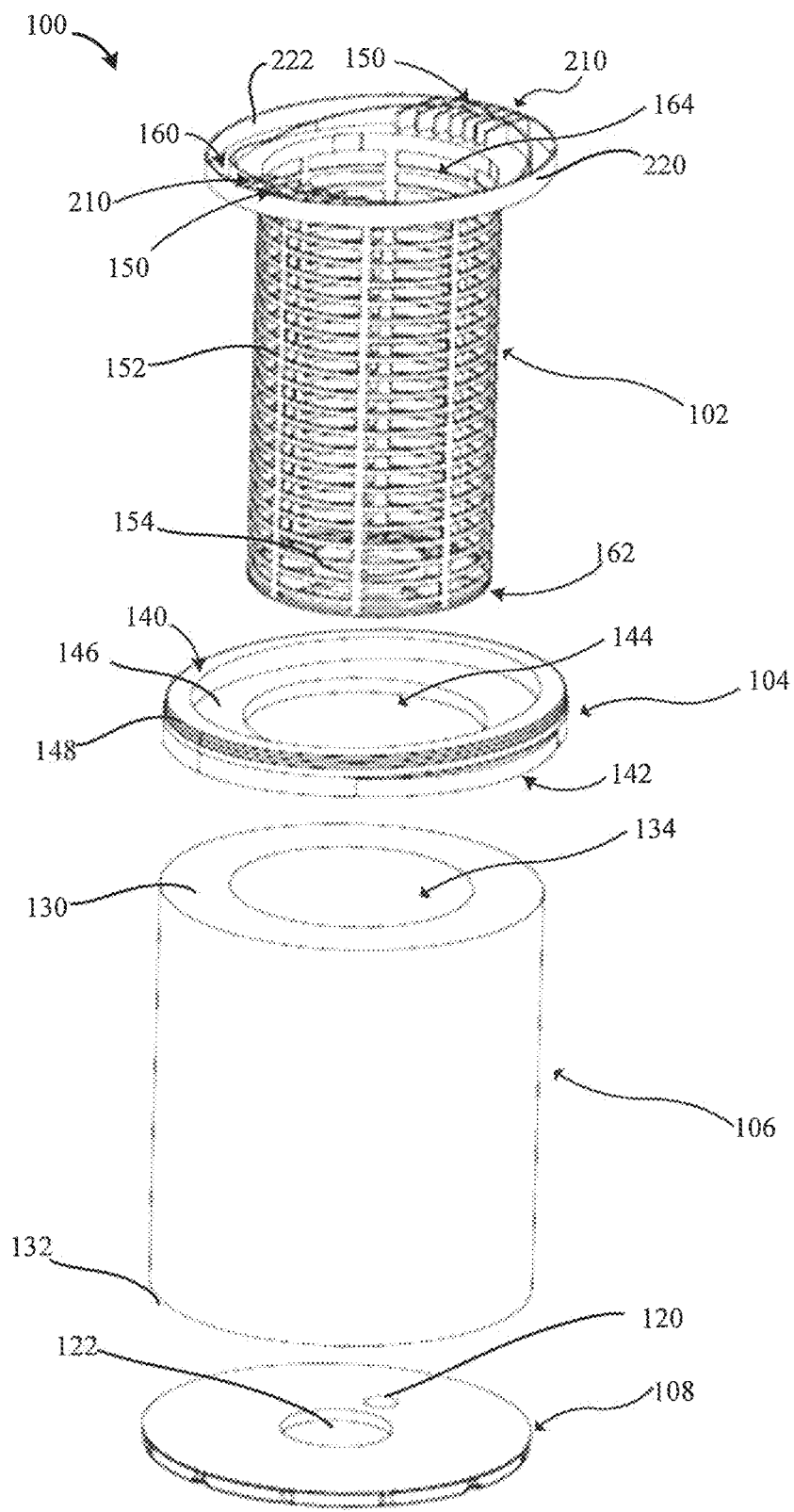
FIG. 1 shows a perspective view of a filter element with a keyed center tube in an unassembled state, according to an example embodiment.

Filtration systems may require additional outlets to an air cleaner when there is auxiliary air flow required by secondary applications (e.g., components, elements, and applications other than the engine). Many current filter elements can be improperly installed and still be closed with a cover and used. As a result, the user may have no indication of the proper installation prior to leakage, damage, or decrease in the quality of the product.

Referring to the figures generally, a filtration system having a filter element with a center tube that includes an installation guidance pocket (e.g., cavity, formed opening, key-slot, etc.) that is configured to receive an installation guidance element (e.g., lug, protruding arm, protruding member, key etc.) to ensure proper orientation of the filter element is shown. The filter element includes a center tube with an installation guidance pocket to provide ease of proper installation, avoid misalignment issues, ensure quality of the product, provide discernable improper installations, reduce assembly time (by the manufacturer throughout the process to an end user), increase productivity, reduces product cost, reduce total cost of/for ownership for customer and ensures quality product, and provide other related benefits.

According to various embodiments, the filter element includes an auxiliary port that is integrated into the filter element end cap such that the auxiliary port carries clean air from inside the filter media of the filter element to secondary applications where clean air is required (e.g., application other than the engine). The installation guidance pocket on the center tube ensures that the auxiliary port is aligned with an auxiliary air flow passage through alignment with a complementary installation guidance element on a housing outlet cover. In other words, the center tube with the installation guidance pocket provides a poke-yoke feature (e.g., lock and key) such that the installation of the filter element with center tube into the housing outlet cover requires a user to manually orient a key-slot on the center tube to receive a key element disposed on an internal portion of the housing outlet cover. Proper installation requires the filter element to be rotated to allow the guidance elements to enter the guidance pockets. If the installation is not proper, an auxiliary air flow port will not interface with the auxiliary air flow passage and there could be potential leakage into other components or lack of sufficient auxiliary air flow to secondary applications. In some embodiments, the center tube includes asymmetric (e.g., the center tube is not symmetrical about a central axis) installation guidance pockets that receive a filter housing outlet cover having complementary installation guidance elements that ensure proper alignment of an auxiliary air flow port and an air flow passage. In other embodiments, the center tube includes symmetric (e.g., the center tube is symmetrical about a central axis) installation guidance pockets that receive a filter housing outlet cover having complementary installation guidance elements that ensure proper alignment of an auxiliary air flow port and air flow passage.

Generally, the installation guidance pockets can be of a wide variety of configurations, including variations in the shape of the installation guidance pocket, size of the installation guidance pocket, and number of installation guidance pockets disposed on the center tube. The installation guidance pocket is configured to have a shape, length, width, and number of elements that is specifically tailored to interface with a housing outlet cover having a complementary member(s). This ensures that the assembly of the filter element and housing is successful only when the filter element and housing are properly aligned (e.g., sealed). The installation guidance element of the housing cove can be of a wide variety of configurations, including variations in the shape of the installation guidance element, size of the installation guidance element, and number of installation guidance elements disposed on the endplate. The installation guidance element is configured to have a shape, length, width, and number of elements that is specifically tailored to interface with a housing. This ensures that the assembly of the filter element and housing is successful only when the filter element and housing are properly aligned (e.g., sealed).

Figure 3:
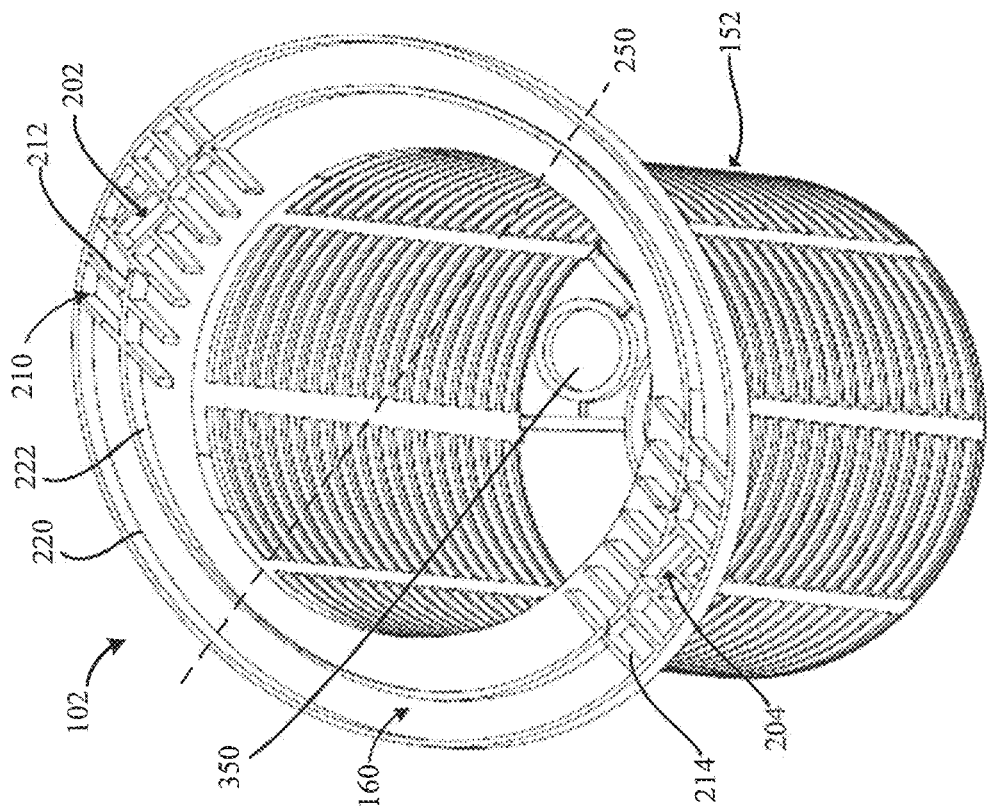
FIG. 3 shows the keyed center tube of the filter element of FIG. 1.
Figure 2:
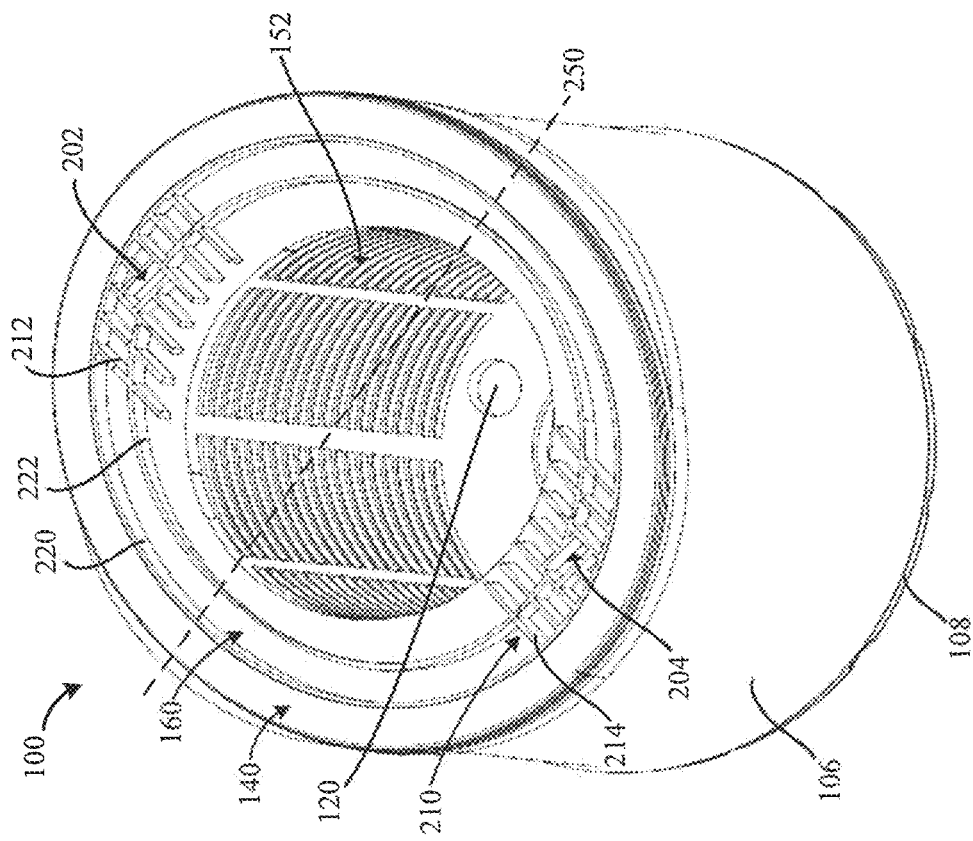
FIG. 2 shows a perspective view of the filter element with the keyed center tube of FIG. 1 in an assembled state.
Figure 4:
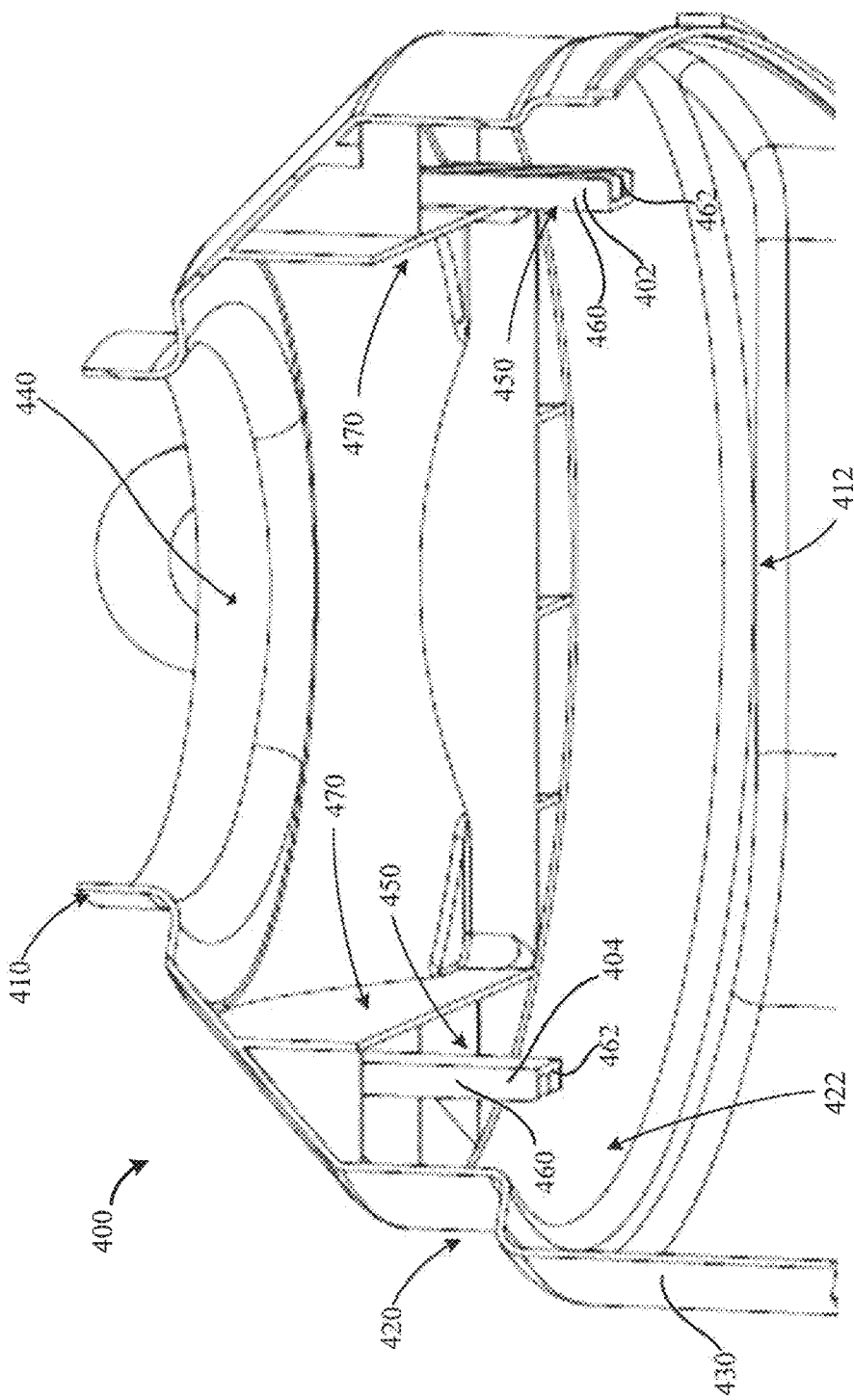
FIG. 4 shows a perspective view of a housing outlet cover with protruding members complementary to the keyed center tube of the filter element of FIG. 3, according to an example embodiment.
Figure 6B:
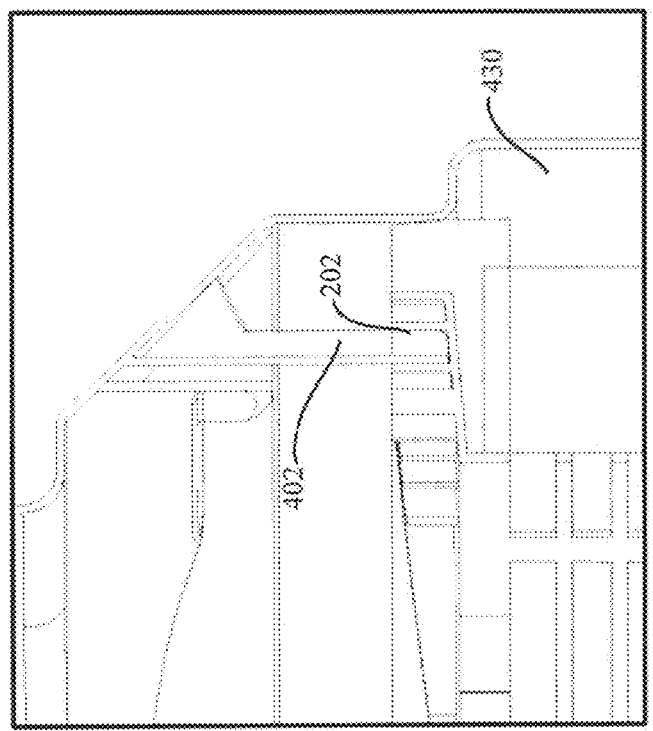
FIG. 6B shows a cross-sectional side view of a portion of the filtration system of FIG. 6A.
Figure 6A:
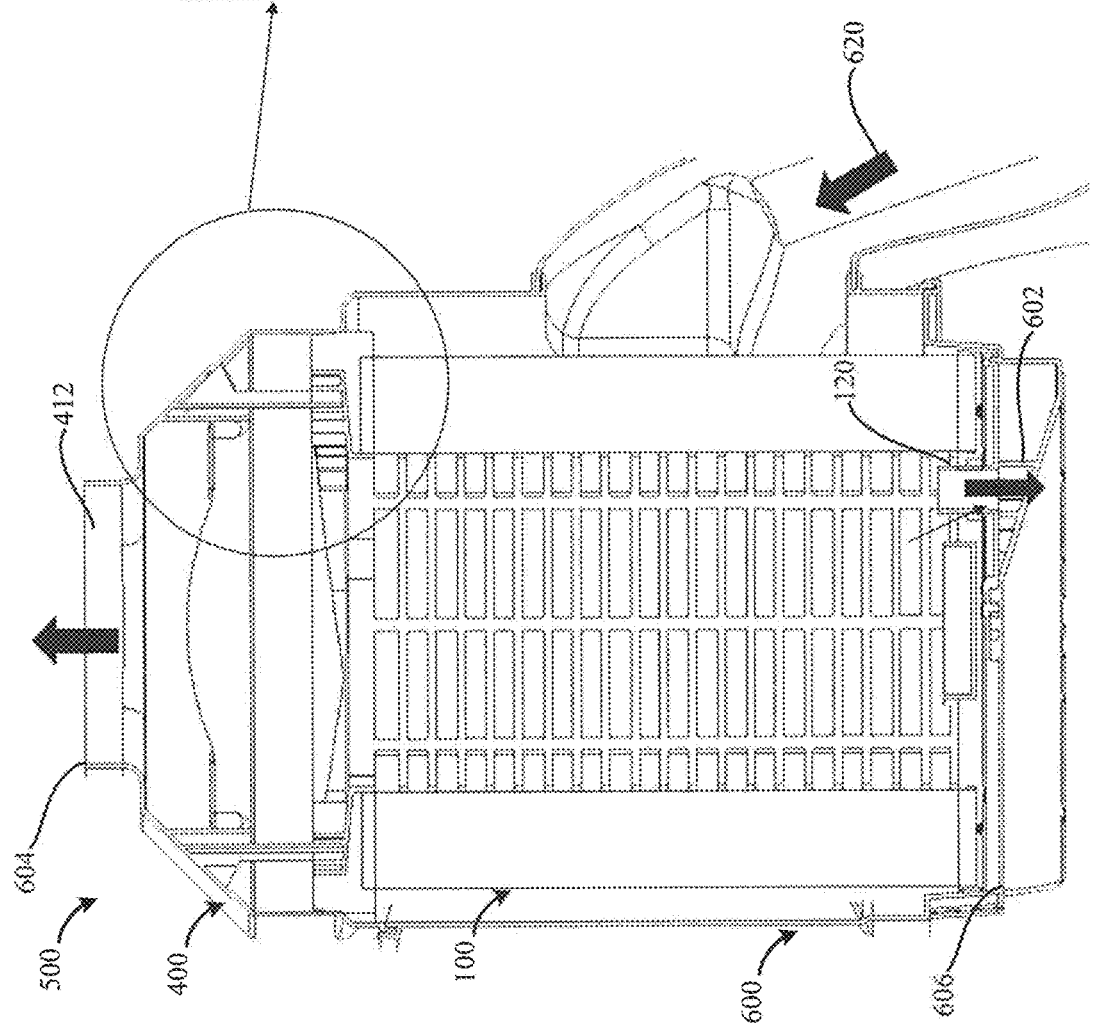
FIG. 6A shows a cross-sectional side view of a filtration system with the filter element with the keyed center tube of FIG. 2 installed within the housing outlet cover of FIG. 4.

Referring to FIG. 1, a filter element 100 is shown in an unassembled state, according to an example embodiment. The filter element 100 includes a center tube 102, first end cap 104, filter media 106, and a second end cap 108. The center tube 102 includes a pair of installation guidance pockets 150 that are structured to act as a poke-yoke by receiving complementary guidance elements, guiding the user to properly align an auxiliary flow port 120 with an auxiliary flow passage in the filtration system 500, as shown in FIG. 6A. As shown in FIGS. 2 and 3, a first pocket 202 of the installation guidance pockets 150 is located 180-degrees about a central axial axis of the center tube 102 (e.g., along the axial length) opposite a second pocket 204 of the installation guidance pockets 150. In other words, the first pocket 202 (e.g., a first installation guidance pocket) and the second pocket 204 (e.g., a second installation guidance pocket) are coplanar. Therefore, and as shown in FIG. 4, a first guidance element 402 of the installation guidance elements 450 of the housing outlet cover 400 is located 180-degrees opposite a second guidance element 404 of the installation guidance elements 450 for proper alignment of the filter element 100 and the housing outlet cover 400.

Figure 5:
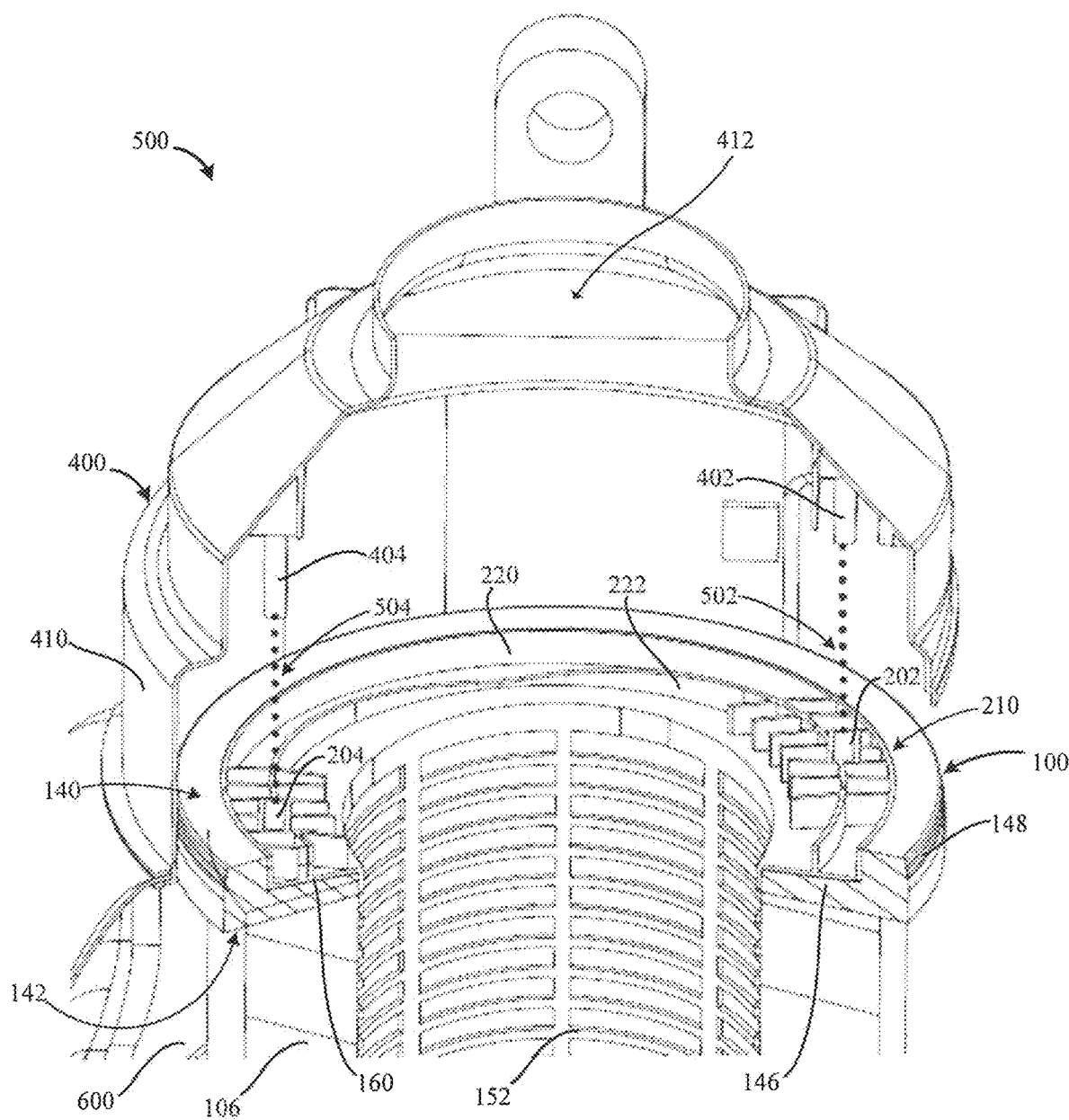
FIG. 5 shows a perspective view of the alignment of the housing outlet cover of FIG. 4 and the filter element with the keyed center tube of FIG. 2.

Referring back to FIG. 1, the second end cap 108 is a closed end cap that includes an auxiliary flow port 120. When the filter element 100 is properly installed and aligned with the housing outlet cover 400—as shown in FIGS. 4 and 5—the auxiliary flow port 120 is aligned with an auxiliary flow passage that allows filtered fluid to flow to secondary applications. The second end cap 108 may include a deformation 122 configured to receive an end of the center tube 102. In some embodiments, the deformation 122 secures the center tube 102 within the filter element 100. When the filter element 100 is assembled, as shown in FIG. 2, the filter media 106 extends axially and is disposed between the first end cap 104 and the second end cap 108.

The filter media 106 defines a central opening 134 that extends axially between a first media end 130 and a second media end 132. The first media end 130 is configured to couple to the first end cap 104 and the second media end 132 is configured to couple to the second end cap 108. In other words, the second end cap 108 is configured to receive the second media end 132 and the first end cap 104 is configured to receive the first media end 130. The central opening 134 is in fluid communication with the auxiliary flow port 120 and the outlet end cap opening 144 of the first end cap 104. The central opening 134 is configured to receive the center tube 102 such that ribs 152 of the center tube 102 extend axially along an internal portion of the filter media when the center tube 102 is positioned within the central opening 134.

The filter media 106 includes an inner clean (e.g., filtered fuel) side and an outer dirty (e.g. unfiltered fuel) side. Accordingly, the filter element 100 is an outside-in flow filter element. Fluid to be filtered passes from the dirty side of the filter media 106 to the clean side of the filter media 106. The filter media 106 may include any of paper-based filter media, fiber-based filter media, foam-based filter media, synthetic filter media, pleated filter media, or the like. Pleated filter media refers to filter media 106 that is folded along a plurality of bend lines extending axially along an axial direction between an upstream inlet and a downstream outlet. In some embodiments, a flat sheet of filter media is alternately folded along a plurality of pleat fold lines, thereby defining a pleat block. The pleated filter media may include a plurality of wall segments extend in serpentine manner between the bend lines and define axial flow channels therebetween.

The first end cap 104 includes a first cap end 140, a second cap end 142 positioned axially away from the first cap end 140, an internal channel 146, and an external threaded portion 148. The first end cap 104 is an open end cap that defines an end cap opening 144 that extends axially through the second cap end 142. When the filter element 100 is assembled, as shown in FIG. 2, the filter media 106 extends axially and is disposed between the second cap end 142 and the second end cap 108. The external threaded portion 148 is along an external surface of the first end cap 104 adjacent the first cap end 140. The external threaded portion 148 may be configured to couple to a threaded portion on a filter housing 600 or similar element. The internal channel 146 is configured to receive a first tube end 160 to couple the center tube 102 to the other components of the filter element 100. As shown in FIG. 1, the internal channel 146 is positioned between the end cap opening 144 and a raised outer wall (e.g., rim) around the circumference of the first end cap 104 that extends from the first cap end 140 axially toward the second cap end 142.

The center tube 102 includes a first tube end 160, a second tube end 162 positioned axially away from the first tube end 160, a plurality of ribs 152 that extend axially between the first tube end 160 and the second tube end 162, and installation guidance pockets 150. The center tube 102 and the plurality of ribs 152 are configured to support the filter media 106 when the center tube 102 is positioned within the central opening 134 of the filter media 106. The center tube 102 defines a central tube opening 164 that extends axially between a first tube end 160 and a second tube end 162. The central tube opening 164 runs axially along the internal portion of the plurality of ribs 152. In some embodiments, the center tube 102 includes a deformation 154 along the second tube end 162 that is complementary to the deformation 122 of the second end cap 108. In some embodiments, the deformation 154 may seal and close an opening in the second end cap 108. As shown in FIG. 3, the center tube 102 includes a tube auxiliary port 350 that is configured to align with—and in some embodiments disposed around or in—the auxiliary port 120 of the second end cap 108 when the center tube 102 is properly installed within the filter element 100.

The center tube 102 includes an outer tube ring 220 that extends from the first tube end 160 axially (e.g., upward) away from the second tube end 162. An inner tube ring 222 extends from the first tube end 160 axially away from the second tube end 162 and is disposed radially inward from the outer tube ring 220 and outward from the central tube opening 164. In some embodiments, the inner tube ring 222 is midway between the outer tube ring 220 and the central tube opening 164. The inner tube ring 222 is configured to contact the installation guidance elements 450 and facilitate rotation of the filter element 100 such that the installation guidance elements 450 ride along the inner tube ring 222 until the installation guidance elements 450 reach and are inserted into the installation guidance pockets 150. A plurality of guidance ribs 210 extend laterally from the outer tube ring 220 inward toward the central tube opening 164 and are configured to guide the filter element 100 to the proper rotation as the installation guidance pockets 150 are aligned with the installation guidance elements 450 of the housing outlet cover 400. As the filter element 100 is installed within the housing outlet cover 400, the installation guidance elements 450 slide over the ribs in the plurality of guidance ribs 210 and cause the user to re-orient the filter element 100 until the correct orientation of the filter element 100 and housing outlet cover 400 is achieved. Once the installation guidance elements 450 are positioned with the installation guidance pockets 150 the auxiliary flow port 120 is aligned with the auxiliary flow passage 602 that allows filtered fluid to flow to secondary applications. As shown in FIGS. 2 and 3, a first set of guidance ribs 212 in the plurality of guidance ribs 210 are located 180-degrees opposite a second set of rib 214 in the plurality of guidance ribs 210. The inner tube ring 222 passes through the first set of guidance ribs 212 and the second set of guidance ribs 214 to define an outer set of guidance ribs between the outer tube ring 220 and the inner tube ring 222 and an inner set of guidance ribs between the inner tube ring 222 and the central tube opening 164. In some embodiments, one or both of the inner tube ring 222 and outer tube ring 220 are flared such that the respective ring is at a lower height along/near a central axis of the center tube 102 and extend axially upward to the locations adjacent the installation guidance pockets 150. The central axis 250 extends laterally along the face (e.g., first tube end 160) of the center tube 102.

As shown in FIGS. 2 and 3, a first pocket 202 of the installation guidance pockets 150 is located 180-degrees opposite a second pocket 204 of the installation guidance pockets 150. The first pocket 202 is positioned within the first set of guidance ribs 212 and along the inner tube ring 222 with an angled orientation with respect to the inner tube ring 222. In some embodiments, the first pocket 202 has a pocket height similar to the rib height of the ribs in the first set of guidance ribs 212. The second pocket 204 is positioned within the second set of guidance ribs 214 and along the inner tube ring 222 with an angled orientation with respect to the inner tube ring 222. In some embodiments, the second pocket 204 has a pocket height similar to the rib height of the ribs in the second set of guidance ribs 214. The first pocket 202 and the second pocket 204 have an asymmetric orientation with respect to the central axis 250 of the center tube 102, such that the orientation of the first pocket 202 and the second pocket 204 is non-parallel to the central axis 250. Accordingly, the first pocket 202 and the second pocket 204, while having a similar shape, have a different orientation that can only receive a guidance element having the same orientation.

Figure 7A:
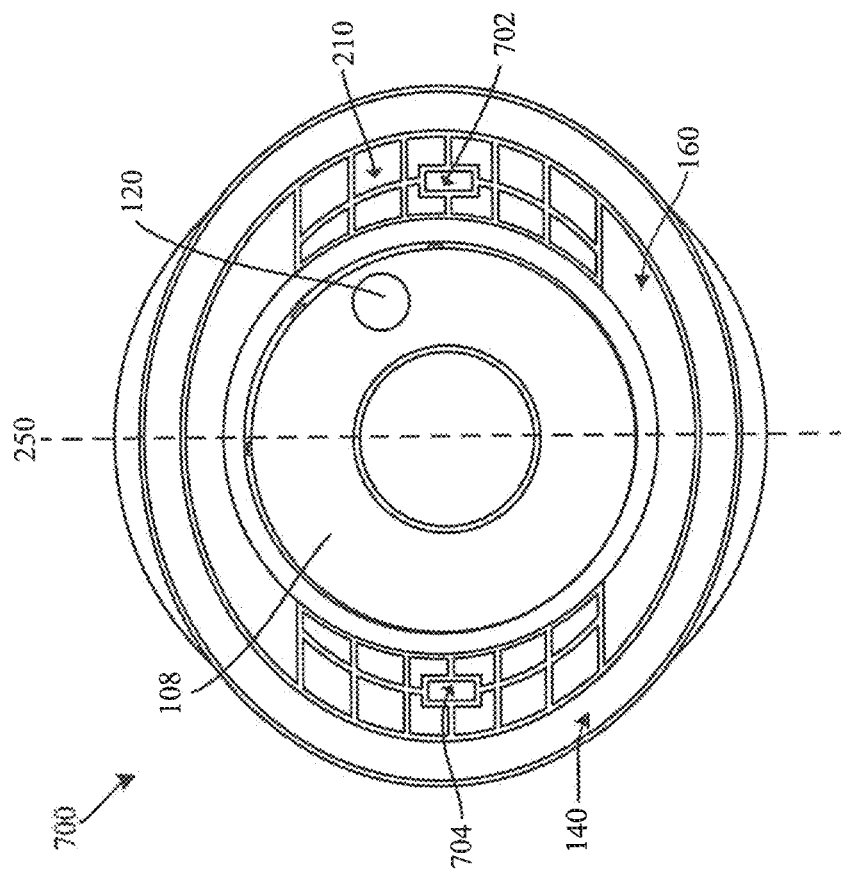
FIG. 7A shows a bottom view of a filter element with a symmetrical keyed center tube in an assembled state, according to another example embodiment.

In some embodiments, and as shown in FIG. 7A, a filter element 700 having a substantially straight orientation of the installation guidance pockets is shown, according to an example embodiment. The filter element 700 is similar to the filter element 100 of FIG. 1. A difference between the filter element 700 and the filter element 100 is the filter element 700 includes a first pocket 702 and a second pocket 704 that are symmetrical, such that they are mirrored about and parallel to the central axis 250 of the center tube 102. Accordingly, similar numbering is used for similar features of the filter element 700 and the filter element 100.

Figure 7B:
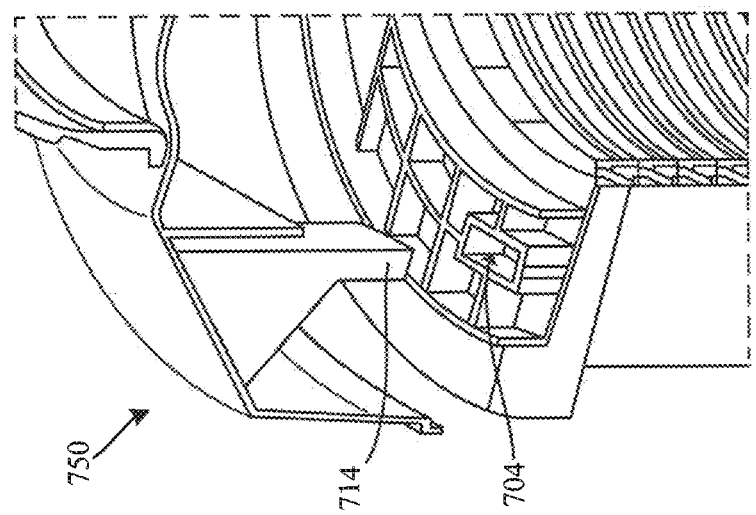
FIG. 7B shows a perspective view of the alignment of a housing outlet cover with protruding members complementary to the symmetrical keyed center tube of the filter element of FIG. 7A, according to another example embodiment.

As shown in FIG. 7B, a housing outlet cover 750 having a substantially straight orientation of the installation guidance elements is shown, according to an example embodiment. The housing outlet cover 750 is similar to the housing outlet cover 400 of FIG. 4. A difference between the housing outlet cover 750 and the housing outlet cover 400 is the housing outlet cover 750 includes a first guidance element and a second guidance element 712 that are symmetrical, such that they are mirrored about and parallel to the central axis 250 of the center tube 102. Accordingly, similar numbering is used for similar features of the housing outlet cover 750 and the housing outlet cover 400. As shown in FIG. 7B, the symmetrical and substantially rectangular-shaped second pocket 704 receives a similarly rectangular-shaped guidance element 712 from the housing outlet cover 750 of a filter housing.

As shown in FIG. 2 and the cross-sectional view of FIG. 5, when the filter element 100 is an assembled state, the first tube end 160 is positioned within and abutting the internal channel 146 of the first end cap 104 such that the outer tube ring 220 abuts a wall of the internal channel 146. The filter element 100 is in an assembled state, it can be inserted into a housing outlet cover 400 to form a filtration system 500 with the auxiliary flow port 120 of the filter element 100 aligned with the auxiliary flow passage 602 of the filter housing 600, as shown in FIG. 6A, which allows fluid filtered by the filter media 106 to flow to secondary applications.

Turning to FIG. 4, the housing outlet cover 400 is shown. The housing outlet cover 400 includes a first cover end 410, a second cover end 412, an external portion 420, and an internal portion 422. The housing outlet cover 400 defines a central cover opening 440 that extends axially between the first cover end 410 and the second cover end 412. The central cover opening 440 is an outlet for the filtration system and the primary flow of the filtered fluid. The auxiliary flow passage 602 of the housing 600 is positioned on an opposite end (e.g., second housing end 606) of the housing from the central cover opening 440 end (e.g., first housing end 604). A shroud 430 extends from the second cover end 412 axially away from the first cover end 410. A pair of installation guidance elements 450 extend from an internal portion 422 axially towards the second cover end 412. The first guidance element 402 of the installation guidance elements 450 of the housing outlet cover 400 is located 180-degrees opposite the second guidance element 404 of the installation guidance elements 450 for proper alignment of the filter element 100 and the housing outlet cover 400. In some embodiments, at least the base portion (e.g., portion adjacent the internal portion 422) of the installation guidance elements 450 are surrounded by a support structure 470, which may include one or more lateral ribs to maintain the shape and orientation of the installation guidance elements 450. In some embodiments, the support structure 470 is configured to contact and abut the plurality of guidance ribs 210 on the center tube 102.

The first guidance element 402 and the second guidance element 404 are asymmetric, angled elements keyed to slide into the first pocket 202 and the second pocket 204, respectively. As shown in FIGS. 4 and 5, each of the first guidance element 402 and the second guidance element 404 include a rectangular axially protruding shaft 460 having a substantially rectangular face 462. The rectangular shaft 460 extends from the internal portion 422 of the housing outlet cover 400 at a location between the first cover end 410 and the second cover end 412 and extends axially toward the second cover end 412. In some embodiments, the rectangular face 462 of the rectangular shaft 460 is substantially co-planar with the second cover end 412. In other embodiments, the rectangular face 462 of the rectangular shaft 460 extends past the second cover end 412 to extend deeper into the installation guidance pockets 150 and/or to accommodate a shroud or skirt that extends from the second cover end 412. In even further embodiments, the rectangular face 462 of the rectangular shaft 460 extends short of the second cover end 412 to complement installation guidance pockets 150 with a shallower depth and/or to accommodate a shroud or skirt that extends from the second cover end 412.

In some embodiments, the rectangular face 462 includes a ribbed portion that is configured to facilitate the guidance of the installation of the installation guidance element 450 into the installation guidance pockets 150. The ribbed portions on the rectangular face 462 may be oriented to complement the plurality of guidance ribs 210 on the center tube 102. In some embodiments, the ribbed portion on the rectangular face 462 includes laterally extending ribs that form a flat-edged "w" shape that are configured to contact a rib in the guidance ribs 210 and prevent further axial movement toward installation (e.g., toward the first cover end 410). While the first guidance element 402 and the second guidance element 404 are shown having identical substantially rectangular shape, in other embodiments, the first guidance element 402 is a different shape from the second guidance element 404. In those embodiments, the first pocket 202 defines a cavity formed to the shape of the first guidance element 402 and the second pocket 204 defines a cavity formed to the shape of the second guidance element 404.

As shown in FIG. 5, as the filter element 100 is inserted into the housing outlet cover 400 or a housing 600, as shown in greater detail in FIG. 6A, to form the filtration system 500, the first guidance element 402 is aligned with the first pocket 202 along the first alignment line 502 and the second guidance element 404 is aligned with the second pocket 204 along the second alignment line 504. In some embodiments, the first pocket 202 and the second pocket 204, while having a similar shape and being asymmetric, have a different orientation the first pocket 202 can only receive the first guidance element 402 and the second pocket 204 can only receive the second guidance element 404. When aligned, the filter element 100 will be able to be installed within, sealed with, and properly positioned within the filter housing outlet cover 400 to form the filtration system 500 with the auxiliary flow port 120 of the filter element 100 aligned with the auxiliary flow passage 602 of the filter housing 600, which allows fluid filtered by the filter media 106 to flow to secondary applications. As shown in FIGS. 6A and 6B, when the filter element 100 is properly installed within the housing outlet cover 400 of the housing 600 to form the filtration system 500, the auxiliary flow passage 602 is aligned with the auxiliary flow port 120 such that fluid from the inlet 620 may flow through the second cover end 412 (e.g., outlet) or the auxiliary flow passage 602 by way of the auxiliary flow port 120.

It should be noted that any use of the term "example" herein to describe various embodiments is intended to indicate that such embodiments are possible examples, representations, and/or illustrations of possible embodiments (and such term is not intended to connote that such embodiments are necessarily extraordinary or superlative examples).

The terms "coupled" and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other example embodiments, and that such variations are intended to be encompassed by the present disclosure.

It is important to note that the construction and arrangement of the various example embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Additionally, features from particular embodiments may be combined with features from other embodiments as would be understood by one of ordinary skill in the art. Other substitutions, modifications, changes and omissions may also be made in the design, operating conditions and arrangement of the various example embodiments without departing from the scope of the present invention.

What is claimed is:

1. A filtration system, comprising:
a filter housing having a first housing end and a second housing end, the filter housing comprising:
a housing cover defining an outlet, the housing cover comprising a first guidance element extending from an internal portion of the housing cover axially away from the outlet, and a second guidance element extending from the internal portion of the housing cover axially away from the outlet; and
a filter element having a first filter end and a second filter end, the filter element comprising:
an end cap adjacent the first filter end and defining an end cap opening therethrough, the end cap comprising a raised outer wall around a circumference of the end cap and a channel, the channel positioned between the end cap opening and the raised outer wall;
a filter media having a first media end and a second media end, the filter media extending axially from the first media end toward the second media end, the first media end adjacent the end cap, the filer media defining a central opening that extends axially between the first media end and the second media end;
a center tube positioned within the central opening of the filter media and having a first tube end positioned within the channel of the end cap and a second tube end positioned axially away from the first tube end, the center tube comprising a first pocket and a second pocket disposed in the first tube end, the first pocket extending axially away from the second tube end, the second pocket extending axially away from the second tube end, wherein the first pocket orientation and the second pocket orientation are non-parallel to a central axis laterally along the first tube end, wherein engagement of the first filter end and the housing cover occurs when the first pocket receives the first housing guidance element and the second pocket receives the second housing guidance element of the filter housing.

2. The filtration system of claim 1, wherein the end cap is a first end cap, further comprising a second end cap adjacent the second filter end, the second end cap being a closed end cap and comprises an auxiliary port and the filter housing comprises an auxiliary flow passage along the second housing end, wherein the auxiliary port is in fluid communication with the auxiliary flow passage when the first pocket receives the first housing guidance element and the second pocket receives the second housing guidance element of the filter housing.

3. The filtration system of claim 2, wherein the outlet is in fluid communication with an engine and the auxiliary flow passage is in fluid communication with a secondary application.

4. The filtration system of claim 1, wherein the center tube defines a central tube opening through the first tube end, and wherein the first pocket is positioned at a location along the first tube end that is 180-degrees rotated about a center point of the central tube opening from the second pocket.

5. The filtration system of claim 1, wherein the center tube further comprises a ring extending from the first tube end axially away from the second tube end, the ring positioned around a circumference of the first tube end.

6. The filtration system of claim 5, wherein the ring is an outer ring, the center tube further comprising an inner ring positioned between the outer ring and a central tube opening through the first tube end of the center tube, wherein the inner ring abuts the first pocket and the second pocket.

7. The filtration system of claim 5, wherein the center tube defines a central tube opening through the first tube end, the center tube further comprising a plurality of guidance ribs extending laterally from the ring inward toward the central tube opening, the plurality of guidance ribs configured to guide the first housing guidance element into the first pocket and the second housing guidance element into the second pocket.

8. The filtration system of claim 7, wherein the plurality of guidance ribs comprises a first set of guidance ribs and a second set of guidance ribs, wherein the first pocket is positioned within the first set of guidance ribs and the second pocket is positioned within the second set of guidance ribs, the first set of guidance ribs positioned at a location along the first tube end that is 180-degrees rotated about a center point of the central tube opening from the second set of guidance ribs.

9. The filtration system of claim 6, wherein the end cap is a first end cap, further comprising a second end cap adjacent the second filter end, and wherein the first end cap has a first cap end and a second cap end, the first end cap comprising an end cap wall positioned around a circumference of the channel of the first end cap and extending from the first end cap axially away from the second end cap, and wherein the outer ring abuts the end cap wall.

10. The filtration system of claim 1, wherein the center tube defines a central tube opening through the first tube end, wherein the center tube further comprises a plurality of ribs extending axially and positioned between the first tube end and a second tube end, wherein the plurality of ribs abut an internal portion of the filter media, the plurality of ribs configured to support the filter media structure.

11. A filter element having a first filter end and a second filter end, the filter element comprising:
an end cap adjacent the first filter end and defining an end cap opening therethrough, the end cap comprising a raised outer wall around a circumference of the end cap and a channel, the channel positioned between the end cap opening and the raised outer wall;
a filter media having a first media end and a second media end, the filter media extending axially from the first media end toward the second media end, the first media end adjacent the end cap, the filer media defining a central opening that extends axially between the first media end and the second media end; and
a center tube positioned within the central opening of the filter media and having a first tube end positioned within the channel of the end cap and a second tube end positioned axially away from the first tube end,
the center tube comprising a first pocket and a second pocket disposed in the first tube end, the first pocket extending axially away from the second tube end; the second pocket extending axially away from the second tube end, wherein the first pocket orientation and the second pocket orientation are non-parallel to a central axis laterally along the first tube end,
the first pocket configured to receive a first housing guidance element of a filter housing and the second pocket configured to receive a second housing guidance element of the filter housing, wherein engagement of the first lifter end and the filter housing occurs when the first pocket receives the first housing guidance element and the second pocket receives the second housing guidance element of the filter housing.

12. The filter element of claim 11, wherein the end cap is a first end cap, further comprising a second end cap adjacent the second filter end, the second end cap being a closed end cap and comprises an auxiliary port and the filter housing comprises an auxiliary flow passage of the filter housing, wherein the auxiliary port is in fluid communication with the auxiliary flow passage when the first pocket receives the first housing guidance element and the second pocket receives the second housing guidance element of the filter housing.

13. The filter element of claim 11, wherein the first pocket and the second pocket have a substantially rectangular shape.

14. The filter element of claim 11, wherein the center tube defines a central tube opening through the first tube end, and wherein the first pocket is positioned at a location along the first tube end that is 180-degrees rotated about a center point of the central tube opening from the second pocket.

15. The filter element of claim 11, wherein the center tube further comprises a ring extending from the first tube end axially away from the second tube end, the ring positioned around a circumference of the first tube end.

16. The filter element of claim 15, wherein the ring is an outer ring, the center tube further comprising an inner ring positioned between the outer ring and a central tube opening through the first tube end of the center tube, wherein the inner ring abuts the first pocket and the second pocket.

17. The filter element of claim 15, wherein the center tube defines a central tube opening through the first tube end, the center tube further comprising a plurality of guidance ribs extending laterally from the ring inward toward the central tube opening, the plurality of guidance ribs configured to guide the first housing guidance element into the first pocket and the second housing guidance element into the second pocket.

18. The filter element of claim 17, wherein the plurality of guidance ribs comprises a first set of guidance ribs and a second set of guidance ribs, wherein the first pocket is positioned within the first set of guidance ribs and the second pocket is positioned within the second set of guidance ribs, the first set of guidance ribs positioned at a location along the first tube end that is 180-degrees rotated about a center point of the central tube opening from the second set of guidance ribs.

19. The filter element of claim 16, wherein the end cap is a first end cap, further comprising a second end cap adjacent the second filter end, and wherein the first end cap has a first cap end and a second cap end, the first end cap comprising an end cap wall positioned around a circumference of the channel of the first end cap and extending from the first end cap axially away from the second end cap, and wherein the outer ring abuts the end cap wall.

20. The filter element of claim 11, wherein the center tube defines a central tube opening through the first tube end, wherein the center tube further comprises a plurality of ribs extending axially and positioned between the first tube end and a second tube end, wherein the plurality of ribs abut an internal portion of the filter media, the plurality of ribs configured to support the filter media structure.

\* \* \* \* \*